(12) United States Patent
Willems, Jr.

(10) Patent No.: US 6,714,381 B2
(45) Date of Patent: Mar. 30, 2004

(54) TAPE MEDIA GUIDING ASSEMBLY FOR PROTECTING A TAPE HEAD

(75) Inventor: John D. Willems, Jr., Boulder, CO (US)

(73) Assignee: Quantum Corporation, San Jose, CA (US)

( * ) Notice: Subject to any disclaimer, the term of this patent is extended or adjusted under 35 U.S.C. 154(b) by 217 days.

(21) Appl. No.: 10/028,887

(22) Filed: Dec. 19, 2001

(65) Prior Publication Data

US 2003/0112556 A1 Jun. 19, 2003

(51) Int. Cl.[7] ................................................. G11B 5/40
(52) U.S. Cl. ................ 360/130.21; 360/128; 360/251.3
(58) Field of Search ............................ 360/85, 95, 128, 360/130.21, 251.1, 251.3; 242/332.4

(56) References Cited

U.S. PATENT DOCUMENTS

| | | | | |
|---|---|---|---|---|
| 6,151,188 A | * | 11/2000 | Takano et al. ................ | 360/95 |
| 6,257,514 B1 | | 7/2001 | Morris et al. ............. | 242/332.1 |
| 6,441,990 B2 | * | 8/2002 | Falace et al. .................. | 360/85 |
| 6,565,028 B2 | * | 5/2003 | Sasaki et al. ............. | 242/332.4 |
| 6,590,743 B2 | * | 7/2003 | Nawa .......................... | 360/128 |
| 6,600,624 B2 | * | 7/2003 | Cope et al. .................... | 360/95 |
| 2002/0122270 A1 | * | 9/2002 | Kano et al. .................... | 360/85 |
| 2003/0048573 A1 | * | 3/2003 | Tamura ........................ | 360/93 |

* cited by examiner

Primary Examiner—Jefferson Evans
(74) Attorney, Agent, or Firm—Patton Boggs LLP (57) ABSTRACT

A guiding assembly in a tape drive employing a single reel for preventing damage to a tape head during the loading and unloading of magnetic tape media from a tape cartridge also employing a single reel. The guiding assembly having a cam that controls the rotational acceleration of a tape guide to obtain a mechanical advantage as the tape guide is pivoted between a retracted position defining a first tape path for reading and writing data and an engaged position defining a second tape path for loading and unloading the tape media.

4 Claims, 9 Drawing Sheets

TAPE MEDIA GUIDING ASSEMBLY FOR PROTECTING A TAPE HEAD

FIELD OF THE INVENTION

The invention relates to digital tape drive storage devices, and in particular, to a guiding assembly in a tape drive employing a single reel for preventing damage to a tape head during loading and unloading of magnetic tape media from a tape cartridge.

PROBLEM

Digital data is stored on tape drives utilizing a variety of designs, but in all cases, magnetic tape media is wound between a pair of tape reels as data is transferred to or from the tape media. In the art of data storage, the physical space required to store data is an important concern. To conserve space, tape drives often use a single reel tape cartridge design, which utilizes a supply reel located within the tape cartridge and a takeup reel located within the tape drive.

After the tape cartridge is inserted into the tape drive, the tape media must be loaded into the tape drive. The loading operation is representative of connecting the tape media to the takeup reel and winding the tape media to a start point or read position. Various methods have been employed to perform this operation. One such method connects the tape media to the takeup reel via a buckle between a tape cartridge leader and a takeup leader. The tape media is terminated at one end by the tape cartridge leader, which is a strong flexible plastic strip containing an ovular aperture on its distal end. The takeup leader is a similar strong flexible plastic strip attached at one end to the takeup reel. The opposing end includes a stem and tab designed to buckle with the ovular aperture on the tape cartridge leader. After the takeup leader and tape cartridge leader are buckled, they are wound through a tape path past the tape head until the beginning of the tape media is in the read position relative to the tape head. Similarly, an unloading operation represents unwinding the takeup leader and tape cartridge leader back past the tape head and unbuckling the tape cartridge leader and takeup leader so that the tape cartridge may be ejected from the tape drive.

It is a problem in the art of digital tape drives to prevent damage to the tape head during the loading and unloading of the tape media. The tape head contains an inductive electromagnetic device including magnetic pole pieces that read and write data onto the tape media surface. Some magnetic heads include a magnetic resistive (MR) read element for separately reading recorded data, with the inductive element serving to only write data. In addition, the tape head includes a smooth surface formed by precision grinding and polishing techniques within a predetermined specification.

Figures 1, 2, 3:
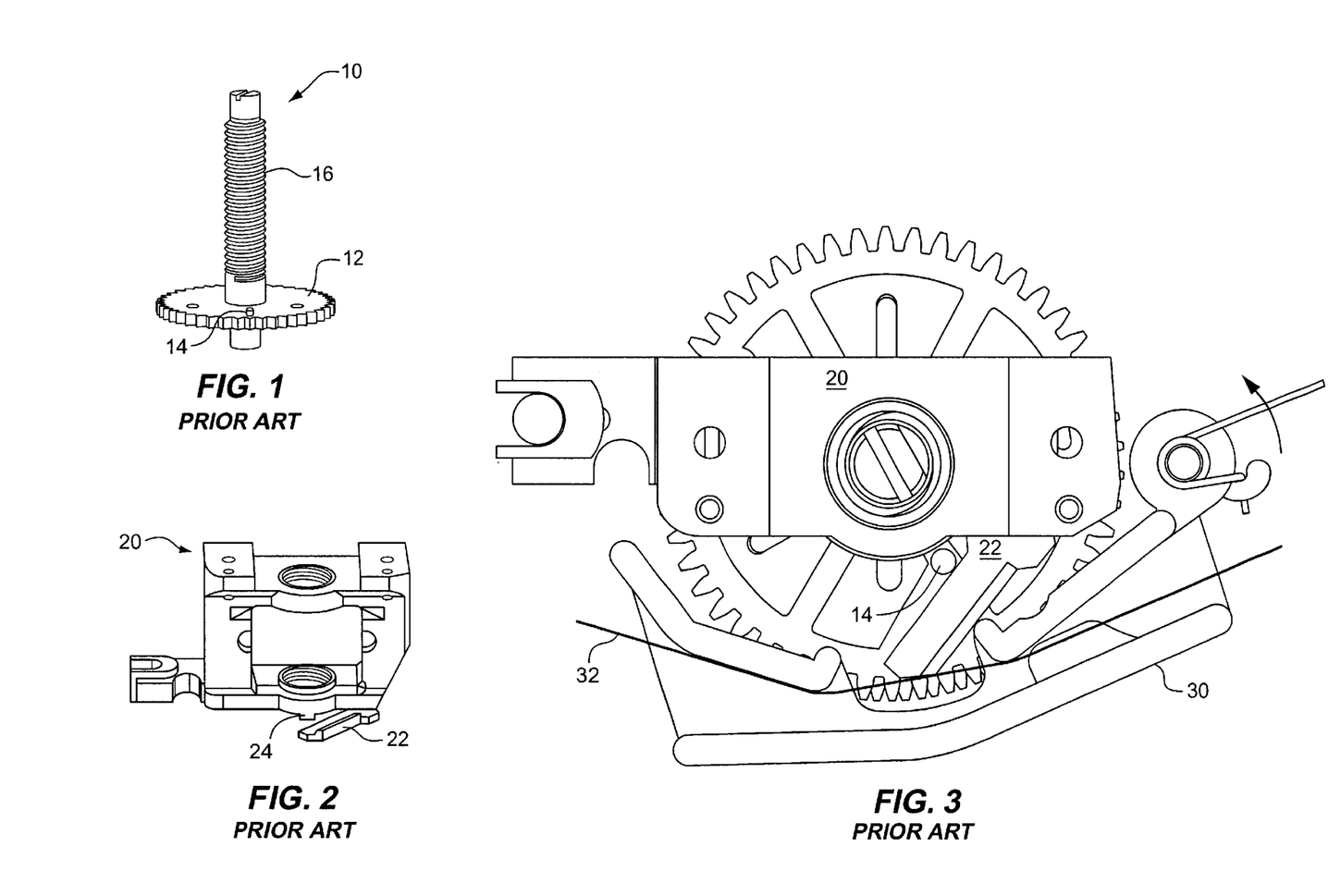
FIG. 1 illustrates a close up perspective of the post and gear assembly of the prior art.
FIG. 2 illustrates a close up perspective of the tape head housing of the prior art.
FIG. 3 illustrates a close up top view of the guiding assembly of the prior art in an engaged position.

A known guiding assembly for moving the tape path away from the tape head during the loading and unloading of the magnetic tape media is disclosed in Morris et al., (U.S. Pat. No. 6,257,514). In Morris, the guiding assembly moves a tape guide between an engaged position and a retracted position. In the engaged position, the tape guide moves the tape path away from the tape head and in the retracted position the tape head is ready for reading and writing of data. Referring to FIGS. 1–3, the major components of the guiding assembly are tape guide 30, post and gear assembly 10 and tape head housing 20. Post and gear assembly 10 in FIG. 1 comprise a threaded post 16 with gear 12 compressed onto the bottom end. Gear 12 includes an integrally formed pin 14 extending vertically upward from gear 12.

Tape head housing 20 in FIG. 2 comprises cam bar 22 and cam stop 24. As post gear assembly 10 moves vertically downward and tape head housing 20 approaches the bottom of threaded post 16, cam bar 22 contacts pin 14. As gear 12 continues to rotate, pin 14 pivots cam bar 22 horizontally outward and away from tape head housing 20. As cam bar 22 pivots outward it contacts tape guide 30 pivoting tape guide 30 away from the tape head. A problem arises as cam bar 22 pivots toward a fully extended position.

Figure 4:
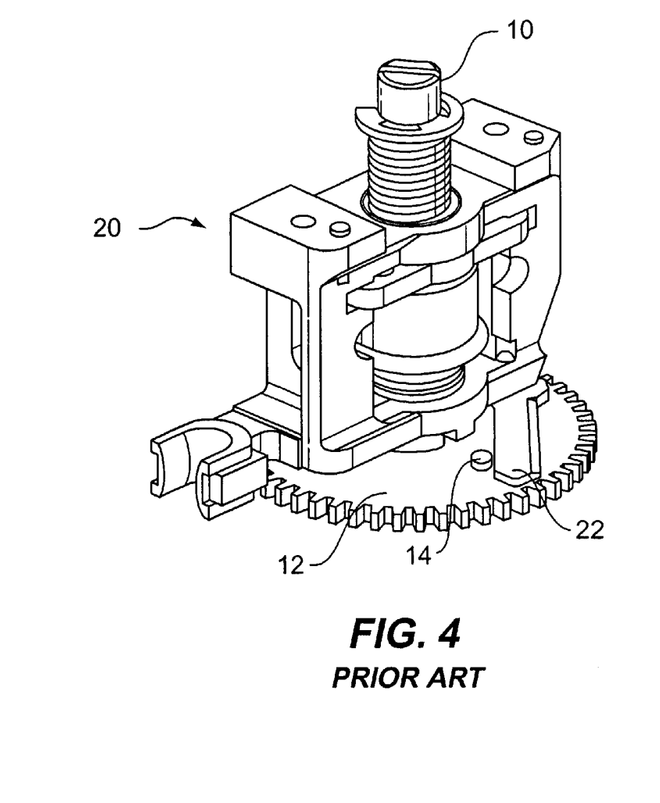
FIG. 4 is a close up top view of the actuation of the guiding assembly of the prior art.
Figure 5:
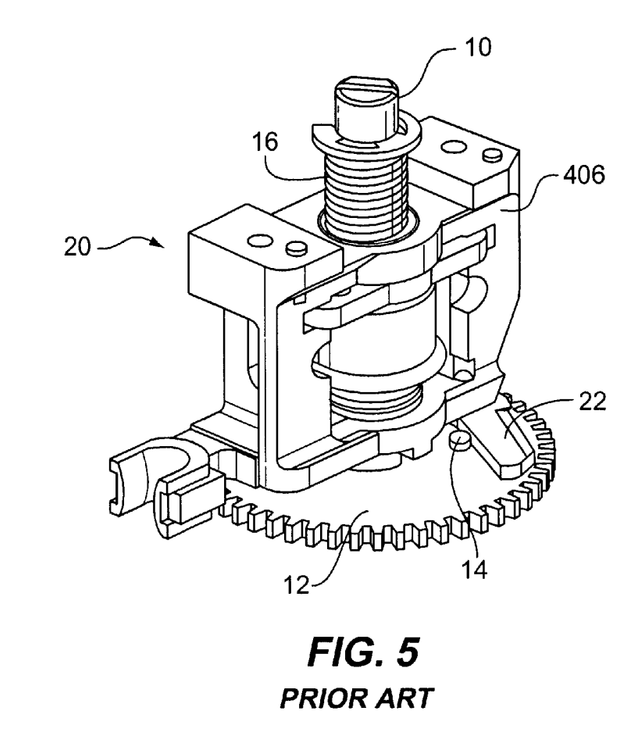
FIG. 5 is another close up top view of the actuation of the guiding assembly of the prior art.

Referring to FIG. 4, initially, as pin 12 pivots cam bar 22, sufficient torque is applied to the distal end of pivoting cam bar 22 which in turn pivots tape guide 30 away from the tape head. As cam bar 22 moves toward the end of travel as illustrated in FIG. 5, the torque applied by pin 14 on pivoting cam bar 22 and thus tape guide 30 decreases. As tape guide 30 moves the tape path away from the tape head, the torque applied by cam bar 22 decreases while the force or tape tension applied in the opposite direction by the tape media in the tape path increases. The decrease in torque applied by cam bar 22 at the end of travel is due to the contact point where pin 14 engages cam bar 22. As cam bar 22 reaches the end of travel, pin 14 applies torque to cam bar 22 at a point nearest the tape head housing 20 as illustrated in FIG. 5, thus decreasing the torque applied to cam bar 22 and tape guide 30. Therefore as the force required by tape guide 30 to move and maintain the tape path away from the tape head increases, the torque applied by cam bar 22 and thus tape guide 30 decreases.

When the tape media is tightly wound between the supply reel in the tape cartridge and the takeup reel in the tape drive, the force applied by cam bar 22 and therefore tape guide 30 has been shown to fail to move the tape path a sufficient distance away from the tape head. Likewise, after the tape path as been moved away from the tape head and the tape media is pulled past the tape head, the force applied by the cam bar has been shown to fail to maintain the position of the tape guide.

For these reasons, a need exists for a guiding assembly that applies a sufficient force to move and maintain the tape path away from the tape head to prevent the takeup leader and tape cartridge leader from contacting the tape head during the loading and unloading of the tape media.

SOLUTION

The present guiding assembly overcomes the problems outlined above and advances the art by providing a guiding assembly that increases the force applied to the tape guide as the tape path is moved further away from the tape head. Advantageously, the guiding assembly protects the tape head from the abrasive nature of the leaders as well as the build up of static charge. In addition, the guiding assembly prevents wear on the takeup leader and tape cartridge leader caused by repetitive contact with the tape head.

The present guiding assembly comprises a tape guide pivotally connected to the tape drive within the tape path. The tape guide is configured to redefine the tape media path of travel during the loading and the unloading operations. During loading of the tape media, the tape guide is pivoted away from the tape head until the takeup leader and tape cartridge leader have been pulled past the tape head and the beginning of the tape media is in the read position. The tape guide is then pivoted adjacent the tape head for reading and writing of data. During unloading the tape guide is again pivoted away from the tape head. The tape guide remains pivoted away from the tape head while the current cartridge is unloaded, and until a new cartridge is inserted and the tape media has been loaded to the read position.

A cam bar pivotally connected to the tape head housing includes a pin integrally connected and extending downward from the cam bar. As the tape head housing approaches the bottom of the threaded post and gear assembly, the pin on the cam bar engages a cam integrally formed on the surface of the gear. As the post and gear assembly continues to rotate, the pin follows the cam rotating the cam bar away from the tape head housing. The arcuate shape of the cam is configured such that as the pin follows the cam, the rotational acceleration of the cam bar is high and the torque applied by the cam bar increases with rotation. As the pin further engages the cam, the rotational acceleration of the cam bar is tapered off. Thus, as increased torque is required to drive the position of the tape guide, the cam bar applies an increased torque. As the cam bar reaches the end of travel, the tape guide is securely held in the engaged position, as the amount of force or tape tension required to drive the tape guide back to the retracted position is maximized.

By increasing the torque applied by the cam bar as the cam bar reaches the end of travel increases the force exerted by the tape guide to move the tape path away from the tape head, thus preventing failure due to insufficient force to drive the tape guide to the engaged position. Additionally, once the cam bar has reached the end of travel, a stop at the end of the cam ensures that the cam bar and thus the tape guide consistently stop at the same position and that the tape guide is held securely in the engaged position.

DETAILED DESCRIPTION

The invention summarized above and defined by the enumerated claims may be better understood by referring to the following detailed description, which should be read in conjunction with the accompanying drawings. This detailed description of the preferred embodiment is not intended to limit the enumerated claims, but to serve as a particular example thereof. In addition, the phraseology and terminology employed herein is for the purpose of description, and not of limitation.

Figure 6:
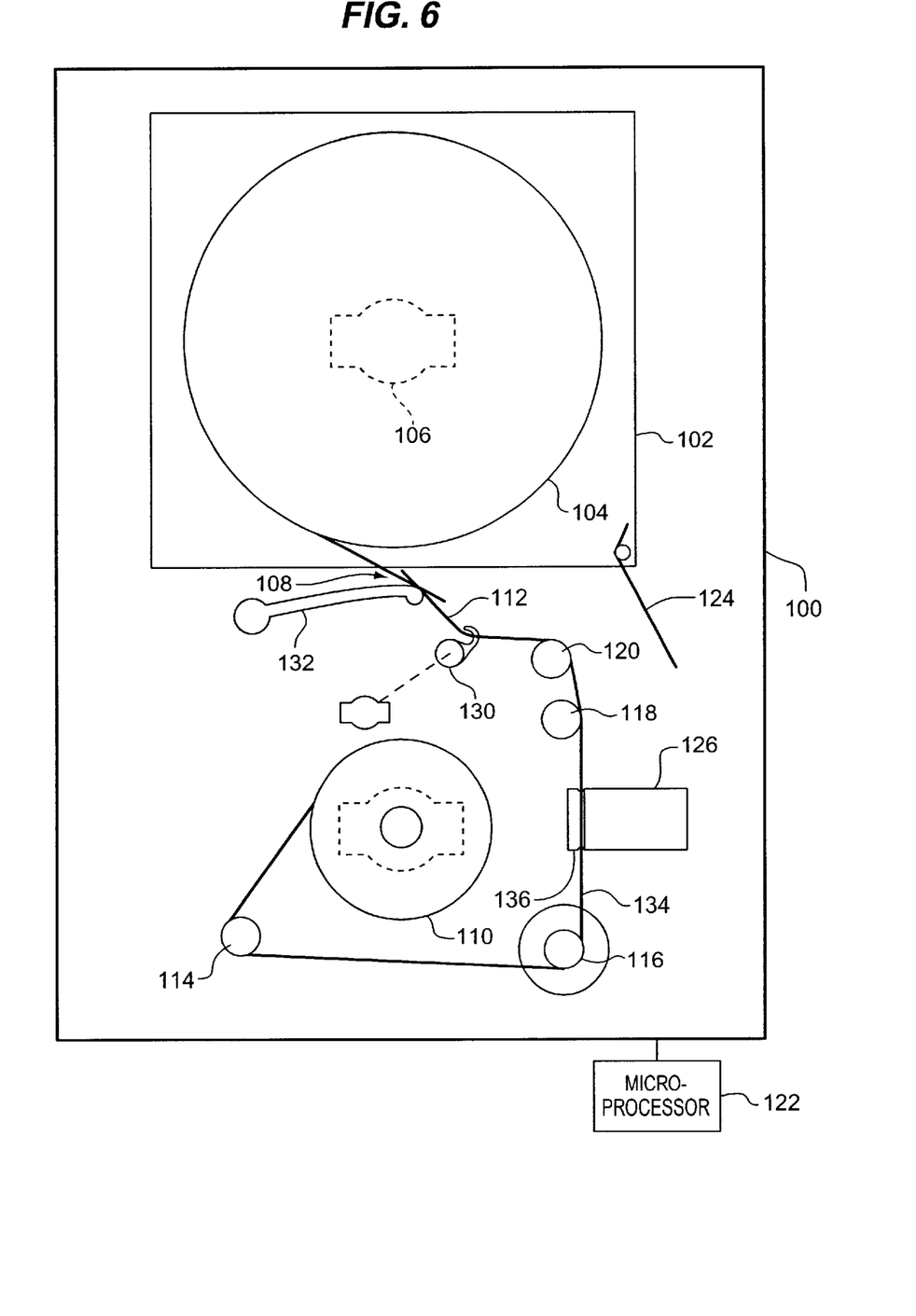
FIG. 6 illustrates a tape drive embodying the guiding assembly of the present invention.
Figure 7:
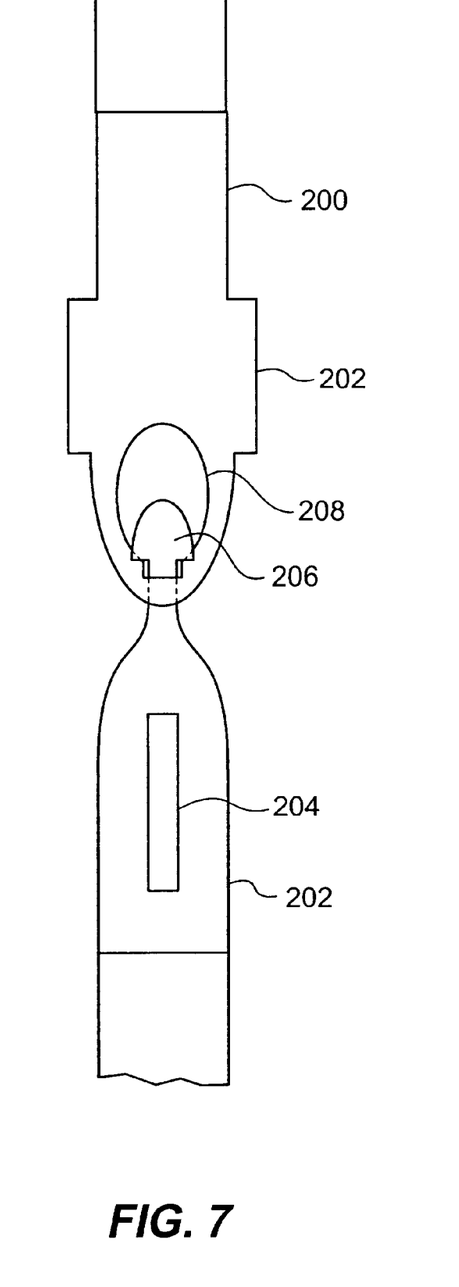
FIG. 7 illustrates a close up top view of a tape cartridge leader and a takeup leader in an example of the present invention.

Loading and Unloading Operation—FIGS. 6 and 7:

Referring first to FIG. 6, operation of tape drive 100 is controlled by microprocessor 122, which is a conventional processor configured with software to operate in accord with the various embodiments of the present guiding assembly. The software will be apparent to those skilled in the art in the context of the following discussion.

The operation of tape drive 100 includes three functions: the loading of magnetic tape media 104, the unloading of magnetic tape media 104, and the reading and writing of data from magnetic tape media 104. During the reading and writing of data, magnetic tape media 104 travels along tape path 134. Tape path 134 includes guide rollers 114, 116, 118, and 120, catch 130, tape head 126, positioning lever 132, and tape guide 136.

The loading of magnetic tape media 104 begins when tape cartridge 102 is inserted into tape drive 100. Tape media 104 is wound around supply reel 106, which is internally housed in tape cartridge 102. The loading operation comprises connecting tape media 104 with takeup reel 110 and winding tape media 104 around takeup reel 110 until tape media 104 is in the read position relative to tape head 126. The unloading operation comprises winding tape media 104 back into tape cartridge 102 and disconnecting tape media 104 from takeup reel 110.

Takeup reel 110 includes a first connecting apparatus 112 attached to takeup reel 110 and wound around guide rollers 114, 116, 118 and 120. Tape media 104 includes a second connecting apparatus 108 attached to its free end and protruding slightly out of tape cartridge 102. Referring to FIG. 7, one example of connecting apparatuses 108 and 112 are tape cartridge leader 200 and takeup leader 202. When tape cartridge 102 is inserted into tape drive 100, tape cartridge leader 200 is positioned to buckle with takeup leader 202. Catch 130 is hooked through slot 204 in takeup leader 202 and positioning lever 132 holds takeup leader 202 so that stem and tab 206 are inserted through aperture 208 in tape cartridge leader 200. Microprocessor 122 responsive to a signal from cartridge present switch 124 rotates catch 130 clockwise to release takeup leader 202. Opposing currents applied to a supply motor and takeup motor (not shown) bias tape cartridge leader 200 and takeup leader 202 in opposing directions completing the buckle. Microprocessor 122 initiates the loading of tape media 104 by winding takeup leader 202 around takeup reel 110 pulling tape media 104 from tape cartridge 102. During winding, takeup leader 202 and tape cartridge leader 200 are pulled past tape head 126 until the beginning of tape media 104 is in the read position relative to tape head 126. The read position can be detected by any conventional method, one example being by an angular position sensor connected to takeup reel 110.

During the unloading of tape media 104, the winding direction is reversed so that tape media 104 is wound back around supply reel 106 and tape cartridge leader 200 and takeup leader 202 are pulled back past tape head 126 into their original position. Catch 130 is rotated counterclockwise to engage slot 204 and unbuckle takeup leader 202 and tape cartridge leader 200.

Figure 8:
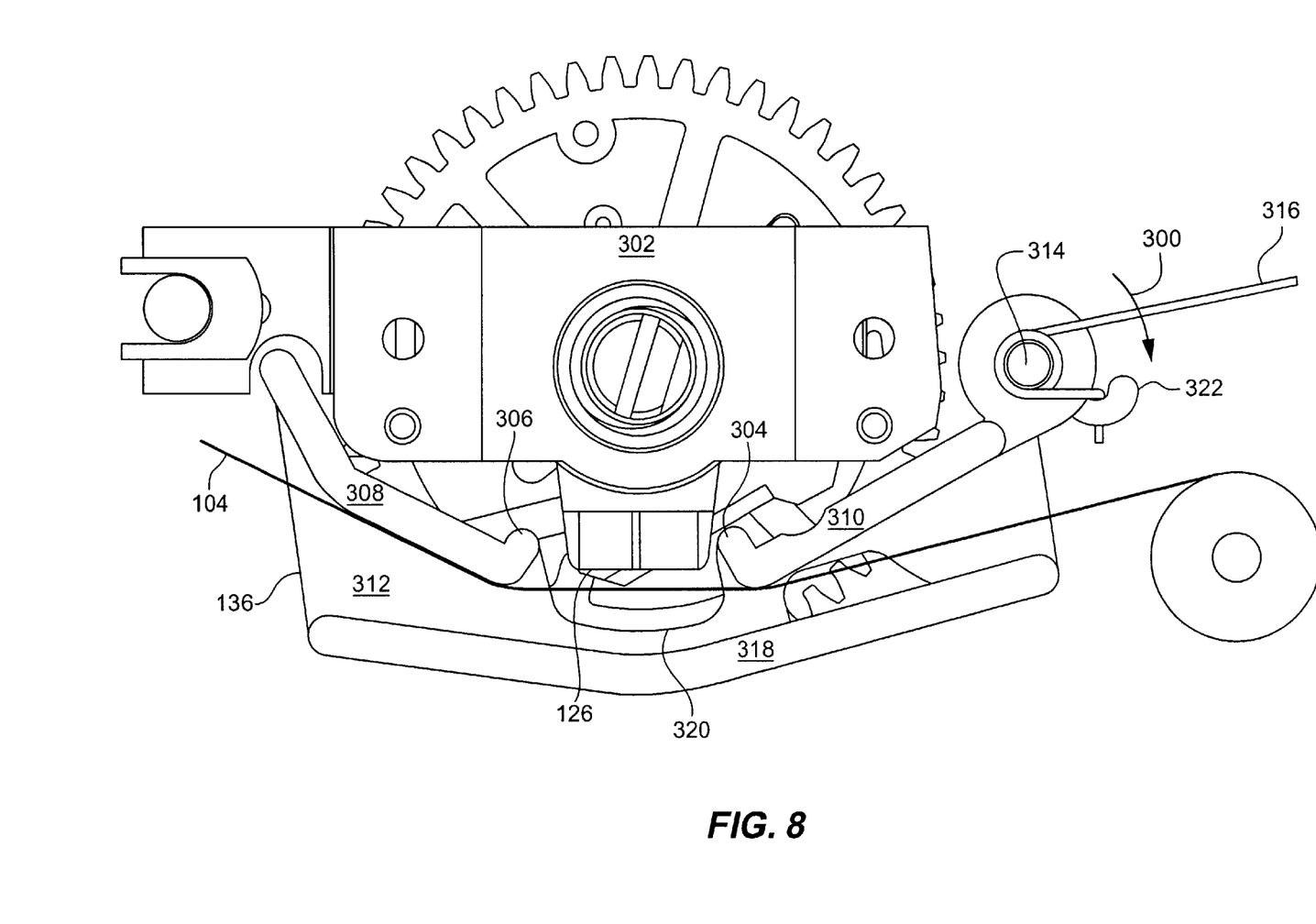
FIG. 8 illustrates a close up top view of the guiding assembly of the present invention in a retracted position.
Figures 9, 10:
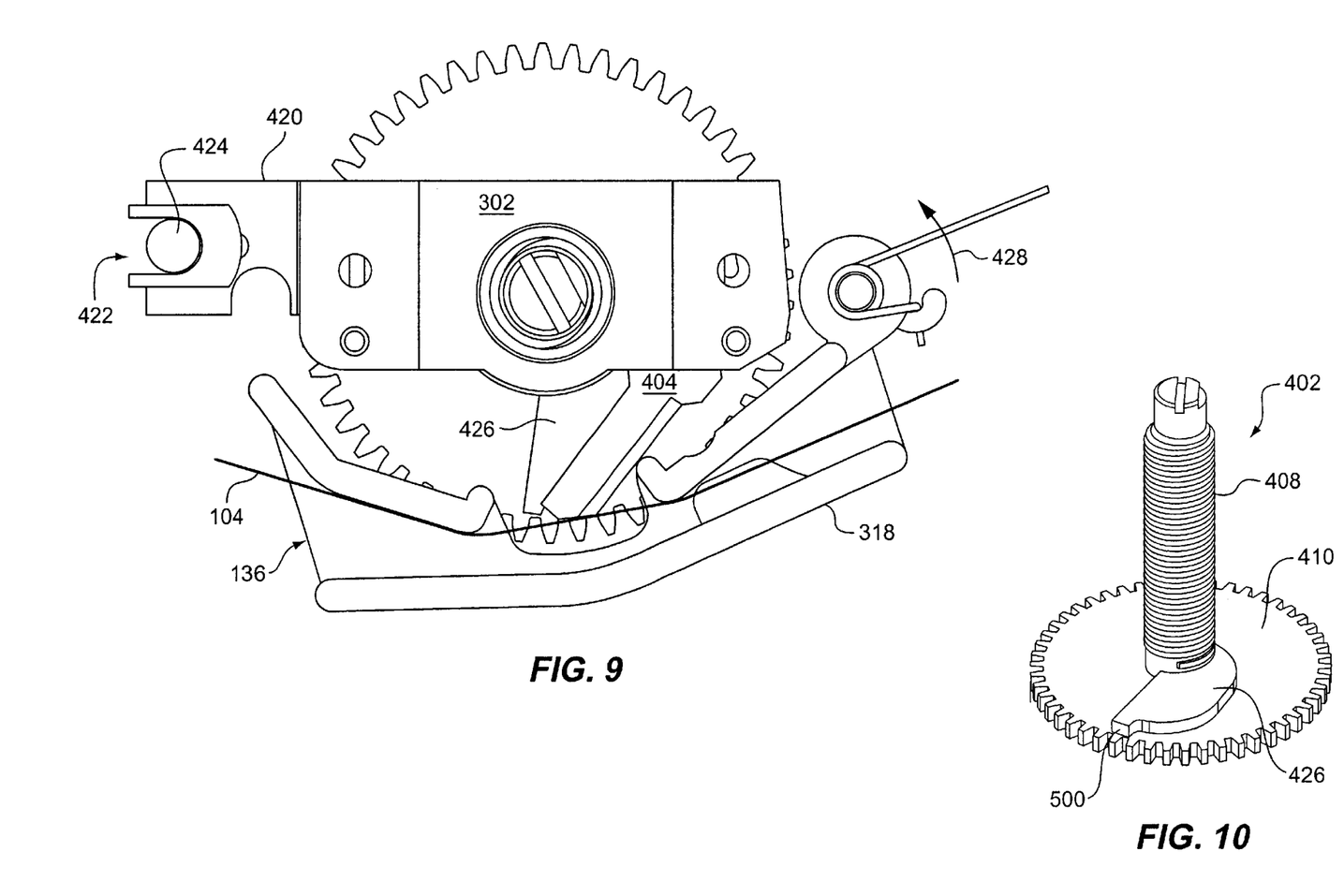
FIG. 9 illustrates a close up top view of the guiding assembly of the present invention in an engaged position.
FIG. 10 illustrates a close up perspective view of the post and gear assembly of the present invention.

The Guiding Assembly—FIGS. 8–11:

Referring first to FIGS. 8 and 9, the present guiding assembly prevents tape cartridge leader 200 and takeup leader 202 from contacting tape head 126 during the loading and unloading operations by moving between engaged position 428 and retracted position 300. It should be noted that tape head 126 is not shown in FIG. 9 so that additional elements and features of the present guiding assembly may be illustrated.

During the loading operation, tape guide 136 moves tape path 134 away from tape head 126 to engaged position 428, as illustrated by FIG. 9. Subsequent to the loading operation, tape guide 136 is retracted to position 300 for reading and writing of data, as illustrated by FIG. 8. During the unloading operation, tape guide 136 again moves to engaged position 428, where it remains until the current tape cartridge is unloaded and another tape cartridge has been loaded and tape media 104 wound to the read position relative to tape head 126. Tape media 104 remains threaded through tape guide 136 at all times.

Still referring to FIG. 8, tape head 126 is connected to tape head housing 302 by conventional methods commonly known in the art. Tape guide 136 is pivotally connected to tape drive 100 by mounting post 314 in a confronting relationship with tape head 126. Tape guide 136 is an elongated arcuate channel defined by bottom 312 and sidewalls, 308 and 310, and backwall 318. One skilled in the art will appreciate that backwall 318 is not a necessary component of tape guide 136, but rather, is added as an additional security for retaining tape media 104 within tape guide 136. During normal operation, tension applied to tape media 104 makes it virtually impossible for tape media 104 to be dislodged from tape guide 136. Sidewalls, 308 and 310, and backwall 318, define a central recessed opening 320. Opening 320 allows tape head 126 to contact tape media 104 when tape guide 136 is in retracted position 300 for reading and writing of data. Sidewalls 308 and 310 include arcuate edges, 306 and 304, which travel vertically downward and further define opening 320. A preferred feature of tape guide 136 is that arcuate edges 306 and 304 facilitate a smooth path of travel for tape media 104. The inward angle of edges 306 and 304 relative to tape media 104 prevent the buckle between tape cartridge leader 200 and takeup leader 202 from snagging or catching on tape guide 136 during operation of tape drive 100.

Referring to FIG. 8, tape guide 136 can be connected to mounting post 314 by any method configured to allow rotation of tape guide 136 around post 314. Spring 316 wraps around the top of post 314 and connects to an integrally formed hook 322 on tape guide 136. Spring 316 biases tape guide 136 in a horizontally inward direction toward tape head 126. As will become apparent from the following description, tape guide 136 will always move toward tape head housing 302 unless prevented from doing so by another member of tape drive 100. One skilled in the art will appreciate that spring 316 may be used to retain tape guide 136 on mounting post 314 or mounting post 314 may be configured to retain tape guide 136 by its own design.

Figure 11:
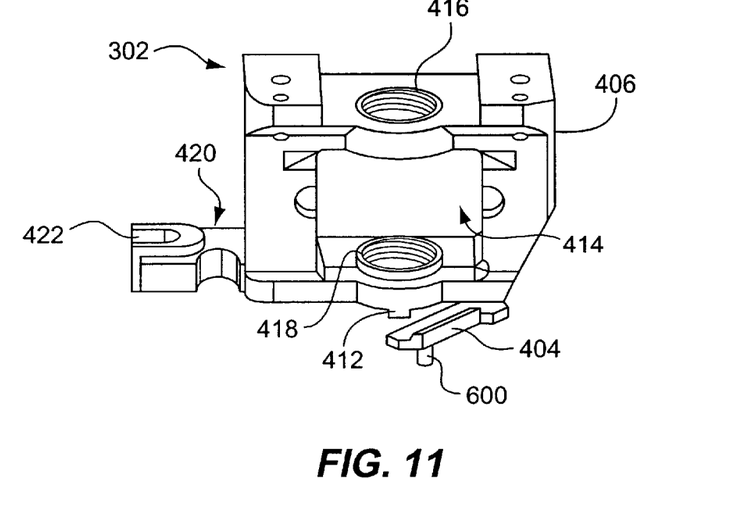
FIG. 11 illustrates a close up perspective view of the tape head housing of the present invention.

Turning to FIGS. 9, 10 and 11, the major components of the present guiding assembly are tape guide 136, post and gear assembly 402 including cam 426, tape head housing 302 including cam bar 404 and pin 600. Post and gear assembly 402, illustrated in FIG. 10, comprise a threaded post 408 with gear 410 compressed onto the bottom end. Post and gear assembly 402 is rotatably connected to tape drive 100. One skilled in the art would understand the construction of post and gear assembly 402 and connection of post and gear assembly 402 to tape drive 100.

Tape head housing 302, illustrated in FIG. 11, comprises a rectangular housing member 406 configured to retain tape head 126 within interior cavity 414. Tape head housing 302 includes cam bar 404 pivotally connected to its base. Tape head housing 302 includes apertures, 416 and 418, for receiving post 408. Apertures, 416 and 418, include internal threads for threadably connecting post 408 and tape head housing 302 as illustrated by FIG. 9.

Cam bar 404 includes an integrally formed pin 600 extending vertically downward from the cam bar 404. Cam bar 404 pivots between cam 426 and stop 412 integrally formed in the base of tape head housing 302. Cam 426 also includes a stop 500 integrally formed in the end of cam 426. Cam 426 is configured such that as the pin 600 initially engages the cam 426 the rotational acceleration of the cam bar 404 is high. As the pin 600 further engages the cam 426, the rotational acceleration of the cam bar 404 is tapered off to increase the mechanical advantage and decrease the amount of force required to drive the tape guide 136. As the cam bar 404 reaches the end of travel, the rotational acceleration of the cam bar 404 decreases to zero so that a minimal amount of force is required to drive and maintain the position of the tape guide 136.

Operationally, a load motor and mating gear (not shown) drive gear 410, which in turn rotates post 408 moving tape head housing 302 vertically up or down post 408 depending on the direction of rotation. Arm 420 integrally formed in the base of tape head housing 302 extends horizontally outward and prevents tape head housing 302 from rotating with post 408 so that vertical movement can be achieved. Arm 420 includes a horseshoe shaped recess 422 on its distal end. Recess 422 is configured to slidably engage post 424 to prevent tape head housing 302 from rotating as it moves vertically upward and vertically downward along threaded post 408. Post 424 is fixably connected to tape drive 100.

Figure 12:
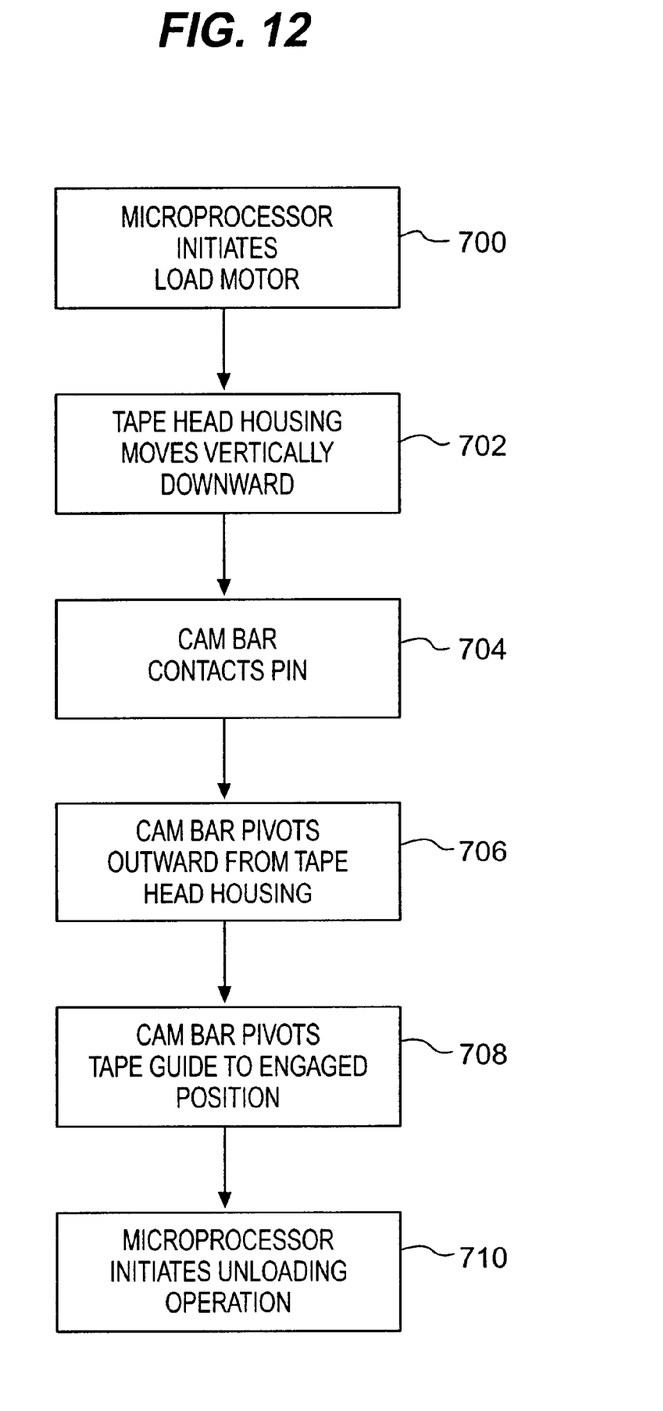
FIG. 12 illustrates a flow diagram of the operating steps of the present guiding assembly during unloading of the tape media.

Guiding Assembly Operation During Unloading of a Tape Media—FIG. 12:

FIG. 12 illustrates a flow diagram of the guiding assembly operation during unloading of tape media 104. During the reading and writing of data, tape guide 136 is located in retracted position 300 relative to tape head 126. Microprocessor 122 responsive to a user input signal to eject tape cartridge 102, initiates operation of the load motor, at step 700. The load motor drives gear 410, which rotates threaded post 408 in a counterclockwise direction. As threaded post 408 rotates, tape head housing 302, moves vertically downward along threaded post 408, at step 702. As tape head housing 302 approaches the bottom of threaded post 408, pin 600 on cam bar 404 engages cam 426, at step 704. Cam 426 pivots cam bar 404 horizontally outward and away from tape head housing 302, at step 706. As cam bar 404 pivots outward it contacts tape guide 136 pivoting tape guide 136 away from tape head 126 to engaged position 428, at step 708. One skilled in the art will appreciate that tape head housing 302, threaded post 408, cam bar 404 and tape guide 136 are configured so that tape head housing reaches the bottom of threaded post 408 as tape guide 136 reaches engaged position 428. Microprocessor 122, sensing that tape guide 136 has reached engaged position 428, initiates the unloading operation winding tape media 104 back into tape cartridge 102 and unbuckling tape cartridge leader 200 and takeup leader 202, at step 710.

Figure 14:
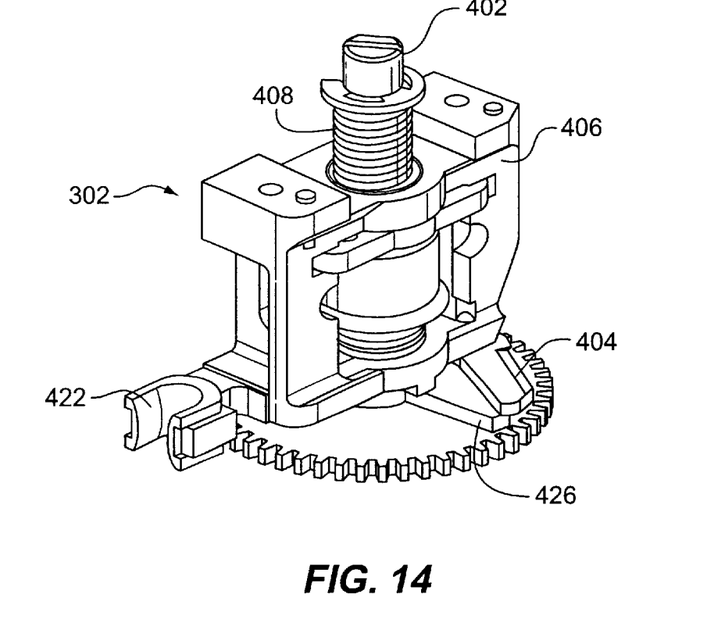
FIG. 14 illustrates a perspective view of the cam and cam bar when the guiding assembly of the present invention is in the engaged position.

The arcuate shape of the cam 426 is configured such that as the pin 600 initially engages the cam 426 the rotational acceleration of the cam bar 404 is high. As the pin 600 further engages the cam 426, the rotational acceleration of the cam bar 404 is tapered off. As the rotational acceleration of the cam bar 404 tapers off, the mechanical advantage increases significantly, thus decreasing the amount of torque required to drive the tape guide 136. As the cam bar 404 reaches the end of travel, illustrated in FIG. 14, the rotational acceleration of the cam bar 404 decreases to zero as the curve of the cam 426 becomes tangent to the rotation of the cam bar 404. Advantageously, as the cam bar reaches the position of FIG. 14, a minimal amount of torque is required to drive and maintain the position of the tape guide 136. The stop 500 further ensures that the cam bar 404 and thus the tape guide 136 consistently stop at the same position. Advantageously, once cam bar 404 reaches the position of FIG. 14, the tape guide 136 is securely held in the engaged position, as the amount of force or tape tension required to drive the tape guide 136 back to the retracted position is maximized.

Figure 13:
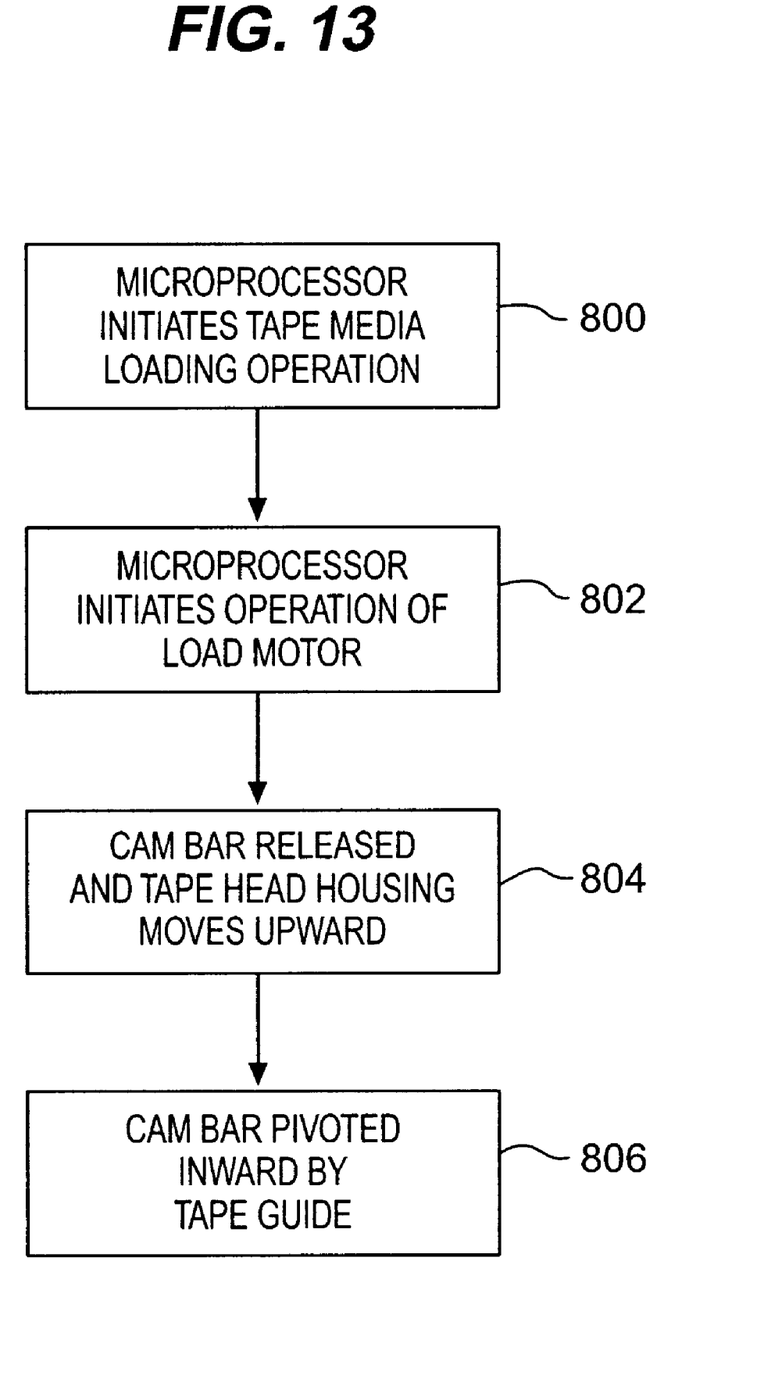
FIG. 13 illustrates a flow diagram of the operating steps of the present guiding assembly during loading of the tape media.

Guiding Assembly Operation During Loading of a Tape Media—FIG. 13:

FIG. 13 illustrates a flow diagram of guiding assembly operation during loading of tape media 104. Tape guide 136 remains in engaged position 428 until another tape cartridge is inserted into tape drive 100. Microprocessor 122, responsive to a signal from cartridge present switch 124 indicating that a tape cartridge has been inserted, initiates the tape media loading operation, at step 800. Microprocessor 122 responsive to a signal indicating that the read position at the beginning of tape media 104 has been reached, initiates operation of the load motor to rotate gear 410 in a clockwise direction, at step 802. The clockwise rotation of gear 410 releases cam bar 404 and moves tape head housing 302 vertically upward along threaded post 408, at step 804. Cam bar 404 is pivoted horizontally inward by pressure from spring-loaded tape guide 136 until it rests against stop 412, at step 806. In this position, cam bar 404 is positioned between tape guide 136 and stop 412, and tape guide 136 is in retracted position 300 for reading and writing of data.

It is apparent that there has been described, a guiding assembly for preventing damage to a tape head during loading and unloading of magnetic tape media, that fully satisfies the objects, aims, and advantages set forth above.

While the guiding assembly has been described in conjunction with a specific embodiment thereof, it is evident that many alternatives, modifications, and/or variations can be devised by those skilled in the art in light of the foregoing description. Accordingly, this description is intended to embrace all such alternatives, modifications and variations as fall within the spirit and scope of the appended claims.

What is claimed is:

1. A guiding assembly in a single reel tape drive configured to prevent damage to a tape head during loading and unloading of a magnetic tape media from a tape cartridge, the guiding assembly comprising:

a tape guide comprising an elongated channel pivotally connected within a tape path and defined by a pair of adjacent sidewalls connected to a bottom;

a tape head housing configured to move vertically with the tape head during the loading and unloading of the magnetic tape media from the tape cartridge; and a cam bar pivotally connected to the tape head housing;

a gear assembly for moving the tape head housing in a vertical direction;

a cam connected to the gear assembly wherein said cam bar engages the cam to variably control the rotational acceleration of the tape guide as the tape guide moves between the engaged position and retracted position.

2. The guiding assembly of claim 1, wherein the pair of sidewalls are orientated in a confronting relationship with the tape head to define an opening that permits the magnetic tape media to contact the tape head when the tape guide defines the first tape path.

3. The guiding assembly of claim 1, wherein the magnetic tape media is prevented from contacting the tape head when the tape guide defines the second tape path.

4. The guiding assembly of claim 1, further comprising:

a backwall that further defines the elongated channel.

* * * * *